(12) United States Patent
Blumenthal

(10) Patent No.: US 10,810,622 B2
(45) Date of Patent: Oct. 20, 2020

(54) SYSTEM AND METHOD FOR GROUND-BASED ADVERTISING

(71) Applicant: Benjamin Elias Blumenthal, Dallas, TX (US)

(72) Inventor: Benjamin Elias Blumenthal, Dallas, TX (US)

(*) Notice: Subject to any disclaimer, the term of this patent is extended or adjusted under 35 U.S.C. 154(b) by 0 days.

(21) Appl. No.: 16/711,955

(22) Filed: Dec. 12, 2019

(65) Prior Publication Data

US 2020/0118171 A1 Apr. 16, 2020

Related U.S. Application Data

(63) Continuation-in-part of application No. 16/657,390, filed on Oct. 18, 2019, which is a continuation-in-part of application No. 16/214,820, filed on Dec. 10, 2018, now Pat. No. 10,453,365, and a continuation-in-part of application No. 16/215,118, filed on Dec. 10, 2018, now Pat. No. 10,593,239, which is a continuation-in-part of application No. 15/922,621, filed on Mar. 15, 2018, now Pat. No. 10,629,104, and a continuation-in-part of application No. 15/922,621, filed on Mar. 15, 2018, now Pat. No. 10,629,104.

(51) Int. Cl.
*G06Q 30/02* (2012.01)
*G08G 1/017* (2006.01)

(52) U.S. Cl.
CPC ......... *G06Q 30/0265* (2013.01); *G08G 1/017* (2013.01)

(58) Field of Classification Search
CPC .............................. G09F 3/208; G06Q 30/0267
See application file for complete search history.

(56) References Cited

U.S. PATENT DOCUMENTS

| | | | |
|---|---|---|---|
| 1,754,851 A | 4/1930 | Dey | |
| 2,920,184 A * | 1/1960 | Kessler | E01F 9/547 362/152 |
| 4,730,146 A * | 3/1988 | Maser | H05B 33/08 313/511 |
| 4,907,361 A | 3/1990 | Villard | |
| 5,263,804 A | 11/1993 | Ernst et al. | |
| 5,483,781 A | 1/1996 | Ernst et al. | |
| 5,772,357 A * | 6/1998 | Evans | E01F 13/105 256/13.1 |
| 5,848,830 A | 12/1998 | Castle et al. | |

(Continued)

FOREIGN PATENT DOCUMENTS

WO WO 02/075704 A1 9/2002

OTHER PUBLICATIONS

Spot on Ads, webpage, http://www.spotonads.com/products, 2014, 3 pages.

(Continued)

*Primary Examiner* — Gary C Hoge
(74) *Attorney, Agent, or Firm* — Standley Law Group LLP; Jeffrey S. Standley; Adam J. Smith

(57) ABSTRACT

Systems and methods for displaying advertisements to occupants of vehicles are disclosed. An electronic display is placed between a transparent or translucent cover and a back unit. A camera captures images which are used to determine vehicle identification information for nearby vehicles. Advertising content is displayed on the electronic display based on the vehicle identification information.

20 Claims, 20 Drawing Sheets

(56) References Cited

U.S. PATENT DOCUMENTS

| | | | |
|---|---|---|---|
| 6,481,921 B1 | 11/2002 | Fenimore et al. | |
| 6,615,526 B2 | 9/2003 | Pitcher et al. | |
| 6,692,182 B1 | 2/2004 | Fenimore et al. | |
| 6,910,293 B1 | 6/2005 | Armstrong et al. | |
| 7,351,003 B1 | 4/2008 | Fenimore et al. | |
| 7,845,611 B1 | 12/2010 | Sholander | |
| 8,250,795 B2 | 8/2012 | Barbieri et al. | |
| 10,410,554 B1 | 9/2019 | Blumenthal | |
| 10,446,067 B2 | 10/2019 | Blumenthal | |
| 10,453,365 B2 | 10/2019 | Blumenthal | |
| 2003/0099105 A1 | 5/2003 | Watson | |
| 2003/0147694 A1 | 8/2003 | Ryman et al. | |
| 2004/0055483 A1 | 3/2004 | Thollin | |
| 2004/0114989 A1 | 6/2004 | Gavronsky | |
| 2005/0229451 A1 | 10/2005 | Mullens et al. | |
| 2006/0239775 A1 | 10/2006 | Klassen | |
| 2007/0222633 A1* | 9/2007 | Blum | G09F 19/228 340/815.4 |
| 2008/0005947 A1* | 1/2008 | Barna | G09F 19/22 40/629 |
| 2009/0282716 A1 | 11/2009 | Barbieri et al. | |
| 2010/0153311 A1 | 6/2010 | McCormick | |
| 2012/0001406 A1 | 1/2012 | Paxton et al. | |
| 2013/0132810 A1 | 5/2013 | Jandt | |
| 2013/0167455 A1 | 7/2013 | Jenkins et al. | |
| 2014/0020273 A1 | 1/2014 | DeMarco | |
| 2014/0059902 A1 | 3/2014 | Brown | |
| 2015/0096209 A1 | 4/2015 | Biehl et al. | |
| 2015/0101222 A1 | 4/2015 | Hochfelsen | |
| 2016/0227897 A1 | 8/2016 | Jobling et al. | |
| 2016/0238052 A1 | 8/2016 | Schaeffer | |
| 2017/0055138 A1 | 2/2017 | McDonnell et al. | |
| 2018/0082612 A1 | 3/2018 | McDade et al. | |
| 2018/0092482 A1 | 4/2018 | Lock | |
| 2018/0108051 A1 | 4/2018 | Rygiel et al. | |
| 2019/0287437 A1 | 9/2019 | Blumenthal | |
| 2019/0287438 A1 | 9/2019 | Blumenthal | |
| 2019/0287439 A1 | 9/2019 | Blumenthal | |
| 2019/0287440 A1 | 9/2019 | Blumenthal | |
| 2019/0287441 A1 | 9/2019 | Blumenthal | |

OTHER PUBLICATIONS

Appellstriping, Youtube Video of Parking lot advertising, https://www.youtube.com/watch?v=tRE4DR5lhhY, Nov. 9, 2018, 2 pages.

* cited by examiner

SYSTEM AND METHOD FOR GROUND-BASED ADVERTISING

CROSS-REFERENCE TO RELATED APPLICATION

This application is a continuation in part of U.S. application Ser. No. 16/657,390 filed Oct. 18, 2019, which is a continuation in part of U.S. application Ser. No. 16/214,820 filed Dec. 10, 2018 and U.S. application Ser. No. 16/215,118 filed Dec. 10, 2018, each of which are continuations in part of U.S. application Ser. No. 15/922,621 filed Mar. 15, 2018, the disclosures of each of the foregoing are hereby incorporated by reference as if fully recited herein.

TECHNICAL FIELD

Exemplary embodiments relate generally to systems and methods for ground-based advertising.

BACKGROUND AND SUMMARY OF THE INVENTION

One of the most pressing business imperatives today is maximizing the value of a property, be it intellectual or physical. Maximizing income is often critical for profitability of a given investment.

Advertising has evolved rapidly with the advent of the Internet and mobile devices. In previous generations, advertising was primarily associated with print media, radio, and television, whereas today's advertising executives are constantly looking for ways to reach potential customers via smartphones, live events (e.g., sports, music, etc.), and Internet browsing.

Traditionally, one of the primary ways a company would advertise outside of the digital space is on physical billboards. These billboards typically reside on the side of a highway or highly trafficked area. The upside to these billboards is that they expose the company's advertisement to many people; however, the quality of exposure is not ideal. A person driving his or her car is presumably paying more attention to the other cars on the road, the call he or she is on, the passengers in the car, or the like, rather than to the content of the billboard advertisement. Additionally, the driver passes the billboard at a high rate of speed, which makes capturing and reflecting on the advertisement difficult. Finally, given the conditions, most people do not take a photo or somehow capture the data on the advertisement as they drive by, making the billboard advertisements less effective.

An alternative to highway billboard advertising that can reach today's on-the-go consumers is in ground-based environments, such as but not limited to sidewalks, roadways, driveways, patios, bike paths, parking lots, and the like. For example, without limitation, when one parks his or her vehicle in a parking lot, a properly placed advertisement may offer a potential customer a quick look at a nearby product or opportunity, thereby creating a slow intake of the information and an impulse to purchase said product or take advantage of said opportunity. Whereas buses and subways are packed with advertisements, private vehicles and parking areas for such vehicles generally sport no such advertisements, and therefore their drivers and passengers are generally difficult to reach. Parking lots offer ideal venues for placing advertisements that drivers and their passages will necessarily see as they enter and leave such structures. Therefore, what is needed is a ground-based advertisement system and method.

These disclosures provide systems and methods for ground-based advertising. Also provided are systems and methods for installation of such ground-based advertising. A plurality of back units may each be adapted for attachment to one of a number of predetermined positions within a parking lot having parking spaces. A plurality of clear or translucent covers may each be adapted for placement over one of the back units. The back unit may include a track for mounting the cover in a slidable manner. The cover and back unit may be configured to receive fasters for securing the cover within the track. Each back unit and the corresponding cover may define a substantially sealed cavity adapted to hold one or more advertisements. The advertisement(s) may be adapted to fit within the cavity. The advertisements may be physical pieces, such as vinyl substrates printed with glow-in-the-dark material. In other embodiments, the advertisements may be images displayed on electronic displays located within the cavities. The advertisements may be illuminated by solar powered LEDs, glow-in-the-dark material, some combination thereof, or the like. The advertisement(s) may include a code, such as but not limited to a QR code, which upon being scanned may retrieve a coupon or further information for use at a nearby retailer. Alternatively, or additionally, the advertisement(s) may include instructions to take a photo of the advertisement and bring it into a nearby retailer for a discount. The cover may comprise a traction material.

An area for installation on the parking lot may be cleaned. A sealant may be applied to the cleaned installation area. A hole may be drilled through the sealed area. Adhesive may be applied to the hole. An anchor may be inserted into the hole. The adhesive may be cured. A fastener may be passed through the advertising unit and into the anchor to secure the advertising unit to the parking lot. In other exemplary embodiments, an adhesive, such as but not limited to two-part epoxy may be used. The area where the adhesive is to be deposited may be first taped off or a stencil may be used. The cleaned area may be excavated such that some or all of the advertising unit may be placed below the surface of the parking lot.

In exemplary embodiments, the back units may be formed by extruding a piece of material, such as metal. One or more side edges of the back units may be likewise formed by extrusion to form a sliding track for the cover. A distal end of each side edge may be crimped to form a backstop for the cover. The advertisement(s) may be deposited within the back unit and the cover may be mounted to the back unit so as to protect the advertisement. Drainage or aeration holes may be created in the back unit to allow water to escape.

Further features and advantages of the devices and systems disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1A:
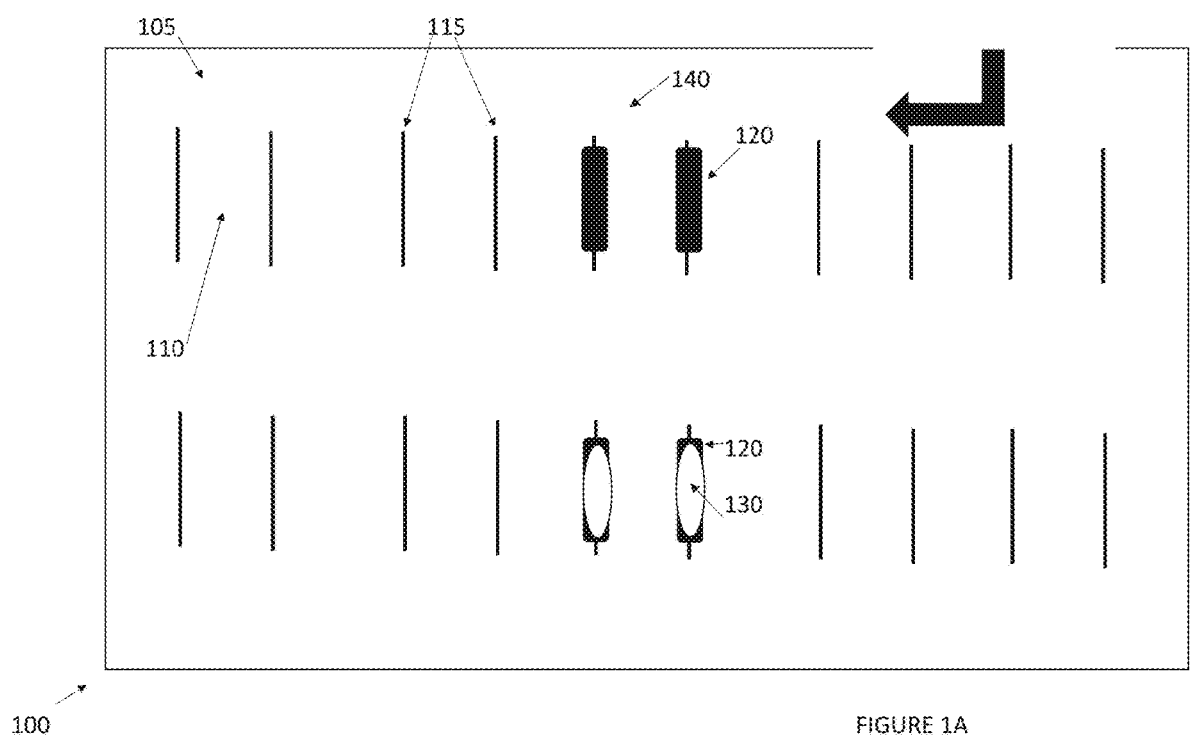
FIG. 1A is top view of an exemplary parking lot with a number of exemplary advertising units installed.

FIG. 1A is a top view of an exemplary parking lot advertising system 100. The parking lot advertising system 100 may include a parking lot 105. The parking lot 105 may be divided into a plurality of parking spaces 110. Any number, shape, and/or arrangement of the parking spaces 110 is contemplated. Each parking space 110 may be defined by one or more dividers 115. The dividers 115 may comprise painted lines. Such painted lines may be white or yellow, though any color is contemplated. Alternatively, or additionally, such dividers 115 may comprise one or more raised structures. Such raised structures may be comprised of cement such as a curb, wheel stop, or the like. Any kind of divider 115 is contemplated. On such dividers 115, or in their place, advertising units 140 may be fixed to the surface of the parking lot 105. However, it is contemplated that such advertising units 140 may be fixed elsewhere in the parking lot 105.

Fixing of the advertising units 140 may be accomplished by any means, including but not limited to, bolting, screwing, nailing, fastening, gluing, adhering, attaching, fixing, bonding, immobilizing, some combination thereof, or the like. It is contemplated that the advertising units 140 may be placed in any pattern, or randomly, throughout some or all of the parking lot 105. In exemplary embodiments, the adverting units 140 may be spaced such that a vehicle can fit between the advertising units 140, though such is not required. For example, without limitation, while the advertising units 140 are illustrated as being located on the dividers 115, it is contemplated that the advertising units 140 may be placed at the head or foot of a parking space 110.

In exemplary embodiments, each of the advertising units 140 may comprise a cover 130 attached to a back unit 120. Each of the covers 130 may be comprised of a polymer, such as but not limited to a polycarbonate, though any material is contemplated. The covers 130 may be transparent or translucent. The covers 130 may be waterproof. Each of the back units 120 may be adapted to withstand the weight and other forces of a car, truck, bus, or other vehicle moving over or resting on said back units 120 without cracking, breaking, or undergoing inelastic deformation. Similarly, each of the covers 130 may be adapted to withstand the weight and other forces of a car, truck, bus, or other vehicle moving over or resting on said covers 130 without cracking, breaking, or undergoing inelastic deformation. The covers 130 may be fastened, attached, joined, combined, or otherwise associated temporarily or permanently with the back units 120. One or more hinging devices may be used to join the back unit 120 and the cover 130. In other exemplary embodiments, the covers 130 may be mounted to the back units 120 in a sliding fashion. The space between the back unit 120 and the cover 130 may define a cavity adapted to receive one or more advertisements 235.

In other exemplary embodiments, a portion of the ground, structure surface, or the like may be excavated to form an excavated area for the advertising unit 140. In such embodiments, the excavated area may be sized such that the top surface of the advertising unit 140 is substantially flush with the ground or surface of the structure, though any height is contemplated. This may reduce or eliminate the risk of tipping over such units. The advertising units 140 may be further configured in size and shape to reduce the risk of tripping over said advertising units 140.

While illustration and discussing is made herein with regards to a parking lot 105, any surface including but not limited to, dirt, grass, gravel, a sidewalk, a bike path, a trail, a lawn, a parking garage, some combination thereof, or the like, is contemplated.

Figure 1B:
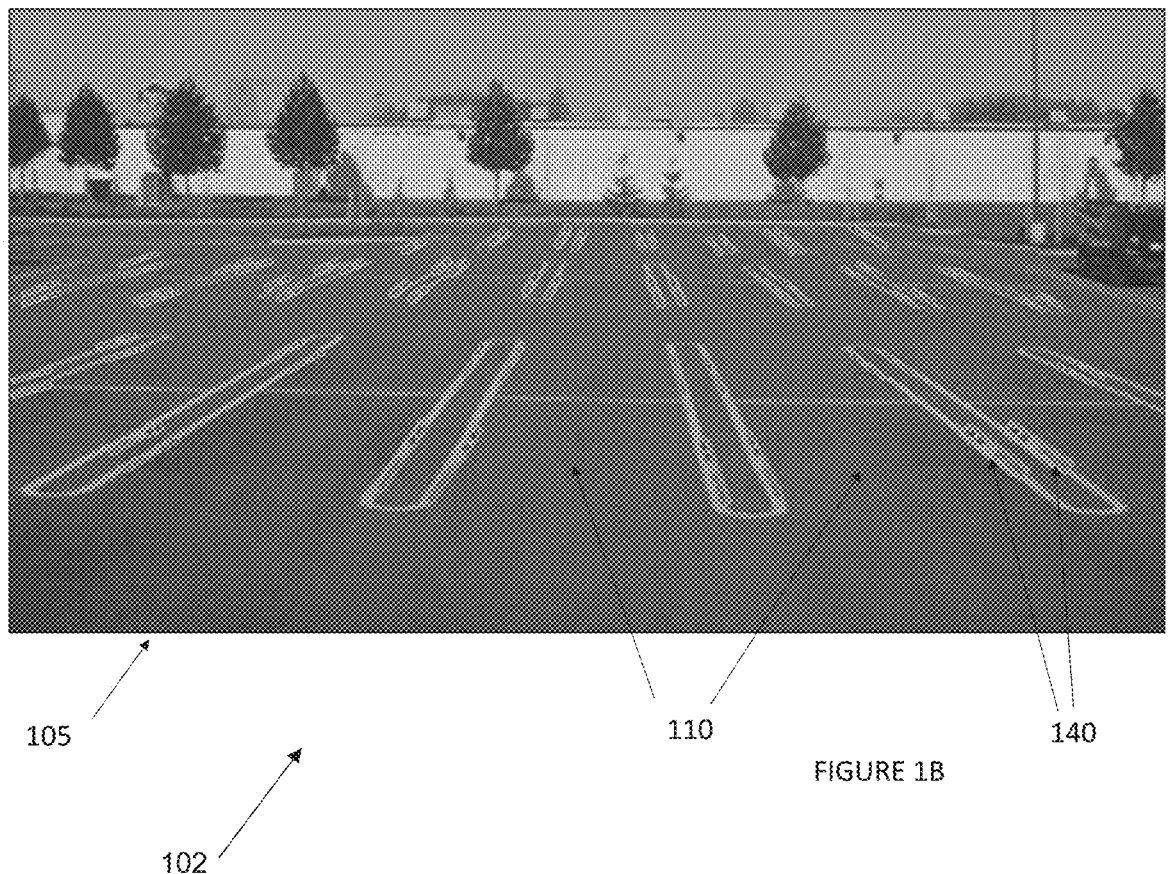
FIG. 1B is a perspective view of another exemplary parking lot with a number of exemplary advertising units installed.

FIG. 1B is a perspective view of another exemplary parking lot advertising system 102. The parking lot 105 may comprise a number of the advertising units 140 placed on the surface of the parking lot 105 around the parking spaces 110. The advertising units 140 may be placed so as to not interfere with parking in the parking spaces 110. The advertising units 140 may be adapted to withstand passing and standing vehicles without damage or inelastic deformation. The advertising units 140 may be made from, or contain one or more advertisements made from, reflective or luminescent material that allows the advertisements to glow during nighttime or other dimly lit conditions after being exposed to a light source. For example, without limitation, the light source may be the sun during daytime or other brightly lit conditions, lamps or other lighting installed at or near the parking lot 105, vehicle headlights, some combination thereof, or the like.

Figure 2D:
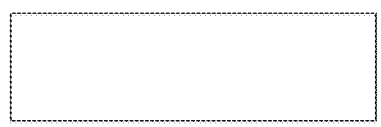
FIG. 2D is a top view of an exemplary back unit for the advertising unit of FIG. 2A.
Figure 2B:
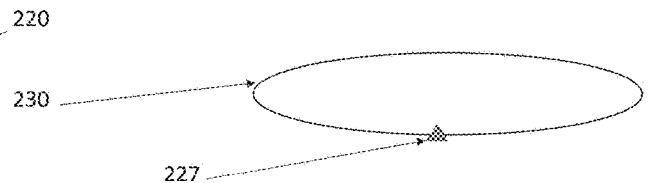
FIG. 2B is a top view of an exemplary cover for the advertising unit of FIG. 2A.
Figure 2C:
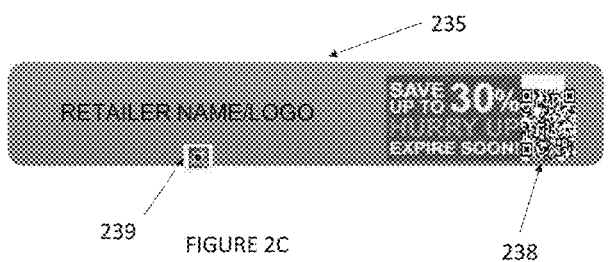
FIG. 2C is a top view of an exemplary advertisement for the advertising unit of FIG. 2A.
Figure 2A:
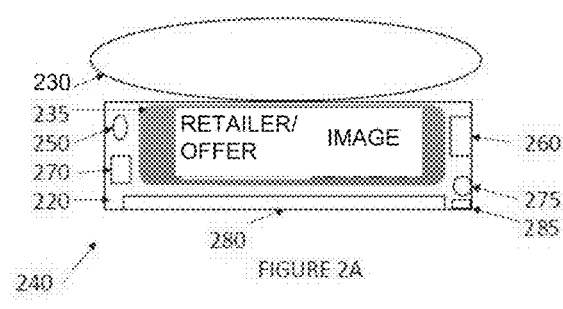
FIG. 2A is a top view of an exemplary advertising unit.

FIG. 2A though FIG. 2D illustrate an exemplary advertising unit 240. A back unit 220 may be attached to the ground, a parking lot 105, other structure, or other surface by any means, including but not limited to a fastener, adhesive, bonding technique, or the like. A cover 230 may be secured to the back unit 220. The cover 230 may be adapted to cover some or all of the back unit 220. Any size or shape cover 230 is contemplated. Any size or shape back unit 220 is contemplated.

A hinge 227 may connect the cover 230 to the back unit 220 to permit selective opening and closing of the cover 230, such as to replace advertisements 235 or otherwise service the advertising unit 240, though such is not required. The space between the back unit 220 and the cover 230 may define a cavity. The cavity may be sized or otherwise adapted to receive one or more advertisements 235. In exemplary embodiments, the cover 230 may be moveable between an opened and a closed position. The cavity may be substantially sealed when the cover 230 is placed in the closed position, though such is not required. In other exemplary embodiments, the cover 230 may be permanently mounted to the back unit 220 in a closed position. When the covered 230 is in a closed position, the back unit 220 and the cover 230 may form a substantially sealed engagement such that the cavity is substantially sealed to prevent air, water, or other contaminant from contacting any advertisements 235 deposited in the cavity, though such is not required. Regardless, the cavity may form a compartment for protecting deposited advertisements 235 and any other objects or components located therein. The cover 230 and/or the back unit 220 may be configured to withstand severe and extreme weather conditions such as, but not limited to, rain, storms, lightning, wind, hail, snow, freezing conditions, sub-zero temperatures, high temperatures, direct sunlight, tornadoes, earthquakes, flooding, hurricanes, tsunamis, some combination thereof, or the like.

The back unit 220, the cover 230, and other components of the advertising unit 240 may be comprised of a material adapted to withstand the weight or other forces, such as but not limited to, torsion and/or sheer forces, generated by a standing or moving vehicle contacting the advertising unit 240 without being crushed, cracked, or otherwise inelastically deformed. In this way, the advertisement 235, and other components, may remain protected within the cavity.

The back unit 220 may be comprised of any material such as, but not limited to, a metal, rubber, polymer, or the like. In exemplary embodiments, an aluminum, such as but not limited to AL 6061, AL 6063, and/or AL 6005, may be utilized. Alternatively, or additionally, a steel such as but not limited to 304, 316, and/or 430 may be utilized. The cover 230 may be comprised of any material such as, but not limited to, a polymer. In exemplary embodiments, the back unit 220 and/or the cover 230 may be manufactured by extrusion, though any manufacturing technique is contemplated. In exemplary embodiments, various edges of the back unit 220 and/or the cover 230 may be formed the extrusion process, though any method of forming is contemplated. Such edges may define a sliding track for the cover 230. In exemplary embodiments, a distal end of each side edge may be crimped to form a backstop for the cover 230. The advertising units 240 may have an overall length of 24 inches, 36 inches, and 48 inches, for example without limitation. Such lengths may be selected to optimize image ratios for deposited advertisements, visibility, cost considerations, manufacturing considerations, shipping considerations, some combination thereof, or the like.

The advertisement 235 may comprise a substrate having content, such as images and/or text, printed thereon. The advertisement 235 may be comprised of any material including but not limited to paper, polymers, metals, vinyl, and the like. In exemplary embodiments, the advertisement 235 may be printed on, or with, a material capable of phosphorescing. For example, without limitation, the material may be capable of phosphorescing by absorbing solar energy from one or more light sources and then subsequently illuminating. The advertisement 235 may comprise colors or may be presented in black and white. The advertisements 235 may be laminated. The advertisement 235 may depict a plurality of advertisements based on optical perspective or may contain a number of images or text for different retailers or other advertisers. Any type, number, and arrangement of images and/or text is contemplated. Advertisements 235 may include optically scannable codes 238, such as but not limited to barcodes, QR codes, or the like, which may permit a consumer to obtain additional information or discounts for use at a nearby retailer, for example without limitation. Alternatively, or additionally, the advertisement 235 may comprise one or more RFID chips 239. The RFID chips 239 may be configured to permit for near range tracking or communication between advertisement 235 and a nearby mobile electronic device, for example without limitation.

The advertising unit 240 may further comprise one or more solar energy devices 250 adapted to convert sunlight or other types of light from one or more other light sources into electrical power. The solar energy devices 250 may comprise, for example without limitation, solar panels, photovoltaic cells, and the like. The advertising unit 240 may further comprise one or more batteries 260 in electrical connection with each of the solar energy devices 250.

The advertising unit 240 may further comprise one or more illumination devices 280. The illumination devices 280 may be in electrical connection with one or more of the batteries 260 and the solar energy devices 250. The illumination devices 280 may comprise, without limitation incandescent lights, fluorescent lights, LED lights, fiber optics, some combination thereof, or the like. The illumination devices 280 may be positioned at various location(s) on the back unit 220. Alternatively, or additionally, the illumination devices 280 may be positioned at various location(s) on the cover 230. The illumination devices 280 may be placed inside or out of the cavity. Any number, type, and location of such illumination devices 280 is contemplated.

The solar energy devices 250 and the batteries 260 may be adapted to provide electrical power to the illumination devices 280 when one or more sensors 275 identify lighting conditions below a predetermined threshold such that illumination is desirable. Alternatively, or additionally, the sensors 275 may comprise timers configured to determine when lighting conditions are likely to be such that illumination is desirable. While solar energy devices 250 are described, alternatively or additionally, a connection to the electrical grid or other power source may supply power to the advertising unit 240. Such connection may be wired or wireless. The sensor 275 may be located within the cavity such that the sensors 275 is protected from vehicular and/or pedestrian traffic. The sensor 275 may be positioned to face upwardly, or at an upward angle, to accurately capture ambient lighting conditions.

The advertising unit 240 may further comprise one or more cameras 270 and associated executable software instructions. The cameras 270 may be adapted to identify vehicles located in proximity with the advertising unit 240. The proximity may be determined by the viewable range of the cameras 270. For example, without limitation, the proximity may be determined by the distance that license plate characters of a vehicle is optically readable from an image received from the camera 270. In other exemplary embodiments, proximity may be considered any parking spaces 110 adjacent the advertising unit 240. Each of the cameras 270 may comprise one or more computing devices 285, which may comprise one or more electronic storage devices, one or more processors, some combination thereof, and the like. The executable software instructions may be stored on the electronic storage devices and may configure the processors to perform the steps and features shown and described herein.

Figure 2E:
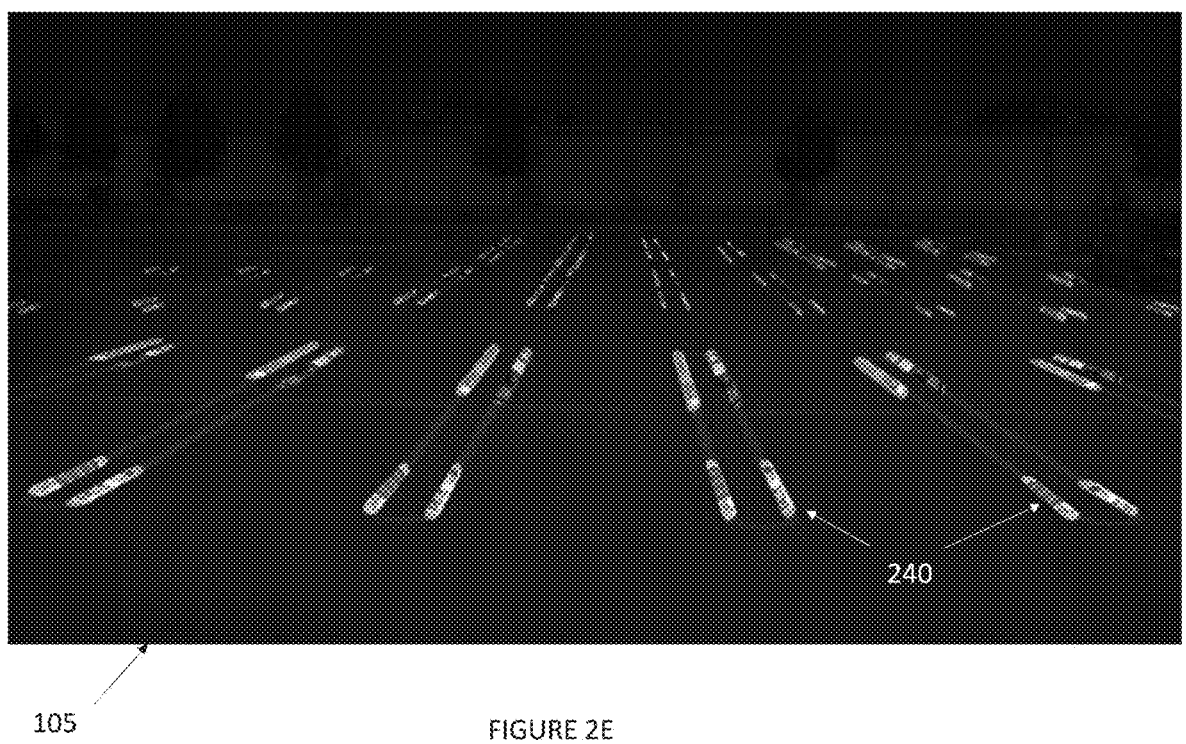
FIG. 2E is a perspective view of a parking lot at night with a plurality of the advertising units of FIG. 2A.

As shown in FIG. 2E, the parking lot 105 may comprise a plurality of advertising units 240. Each of the advertising units 240 may be illuminated by the illumination devices 280 of the respective advertising unit 240, such as, without limitation, by the electrical energy stored in the associated batteries 260. The sensors 275 may be configured to identify appropriate timing or lighting conditions for activating the illumination devices 280. Alternatively, the timing and lighting controls may be preprogrammed.

Figure 3:
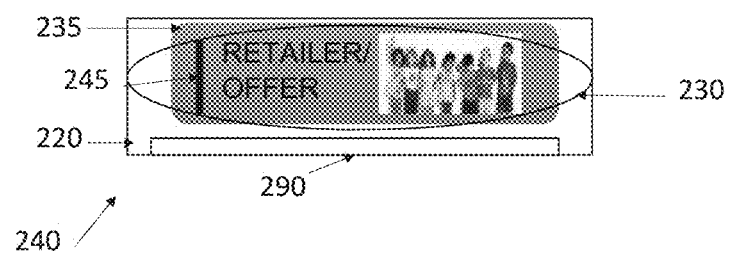
FIG. 3 is a top view of another exemplary advertising unit.

As illustrated in FIG. 3, the advertising unit 240 may comprise a phosphorescent or similar material 290. The material 290 may be configured to illuminate the advertisement 235 deposited within the cavity for some or all of the nighttime. The material 290 may be used in addition to, or in substitution of, the illumination devices 280. The material 290 may be deposited in one, or multiple, locations of the advertising unit 240. The material may be placed to form any shape or pattern. The material 290 may comprise, for example, without limitation, a zinc sulfide, strontium aluminate, calcium sulfide, or phosphorescent pigment.

A slot 245 may be provided at the cover 230. The slot 245 may be configured to permit the insertion and/or removal of advertisements 235, such as per timing and business arrangement with clients. The slot 245 may comprise a slot cover operable between a closed and an opened position. When the slot cover is in the closed position, in exemplary embodiments without limitation, the cavity may remain substantially sealed.

Figure 4:
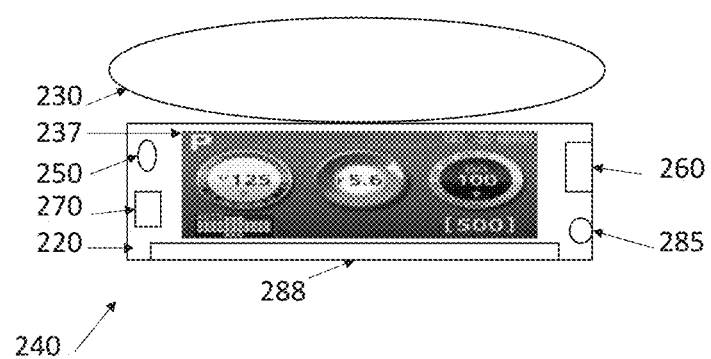
FIG. 4 is a top view of another exemplary advertising unit.

As illustrated in FIG. 4 an electronic display 237 may be located within the cavity. The electronic display 237 may be adapted to withstand the weight or other forces generated by a vehicle resting on, or moving over, the advertising unit 240. In other exemplary embodiments, the electronic display 237 need not be so configured as it is protected by the back unit 220 and/or the cover 230. The electronic display 237 may be a liquid crystal type display, light emitting diode type display, rear projection, cathode ray tube, organic light emitting diode, some combination thereof, or the like.

The advertising unit 240 may, alternatively or additionally, comprise one or more photovoltaic cells 250. Such photovoltaic cells 250 may be electrically connected to the electronic display 237. One or more batteries 260 may be electrically connected to the photovoltaic cells 250. The batteries 260 may also be electrically connected to the electronic display 237. The photovoltaic cells 250 and the batteries 260 may be adapted to supply power to the electronic display 237 such that the electronic display 237 may display images, such as but not limited to, advertising, notifications, or other content.

The images may be delivered to the advertising unit 240 by way of a network connection device 285. The network connection device 285 may be connected to a network, such as but not limited to, a cellular network, the internet, an intranet, the world wide web, or the like. The network connection device 285 may be powered by a wired electrical connection or a wireless electrical connection. The network connection device 285 may be connected to the network by way of a wired or wireless connection.

The advertising unit 240 may further comprise a controller 288. The controller 288 may be a server, database, or the like. The controller 288 may be in electronic communication with the electronic display 237 and the network connection device 285. The controller 288 may comprise executable software instructions, which when executed, configure the controller 288 to receive and store advertising content received at the network connection device 285. The software may further configure the controller 288 to direct the electronic display 237 to display particular images. The controller 288 may be configured to select, for example without limitation, the images and/or text displayed, the timing of advertisements, and the order of multiple advertisements. For example, without limitation, the controller 288 may be configured to change the displayed image and/or text after a predetermined period of time, such as but not limited to, 15 minutes, 30 minutes, 1 hour, 2 hours, 10 hours, 24 hours, one week, two weeks, or one month. Any interval of time is contemplated.

The camera 270 may transfer data regarding images captured to the controller 288. The controller 288 may be configured to select the images to be displayed on the electronic display 237 based upon the specific car make and/or model as identified by the camera 270 or the controller 288. Alternatively, or additionally, the controller 288 may be configured to optically recognize the license plate of the vehicle and perform an electronic lookup of the registered owner of the vehicle. The controller 288 may be configured to select the images to be displayed on the electronic display 237 based on the information discovered about the owner of the vehicle, such as but not limited to, area of residence, age, gender, income, some combination thereof, or the like.

The controller 288 may be located within the cavity, though any location is contemplated. In other exemplary embodiments, the controller 288 is located remote from the advertising unit 240 and is in wireless or wired communication with the advertising unit 240. In still other exemplary embodiments, a single controller 288 may be in communication with multiple advertising units 240 within a given parking lot 105. The controller 288 may likewise be in communication with multiple advertising units 240 across multiple parking lots 105.

Figure 5:
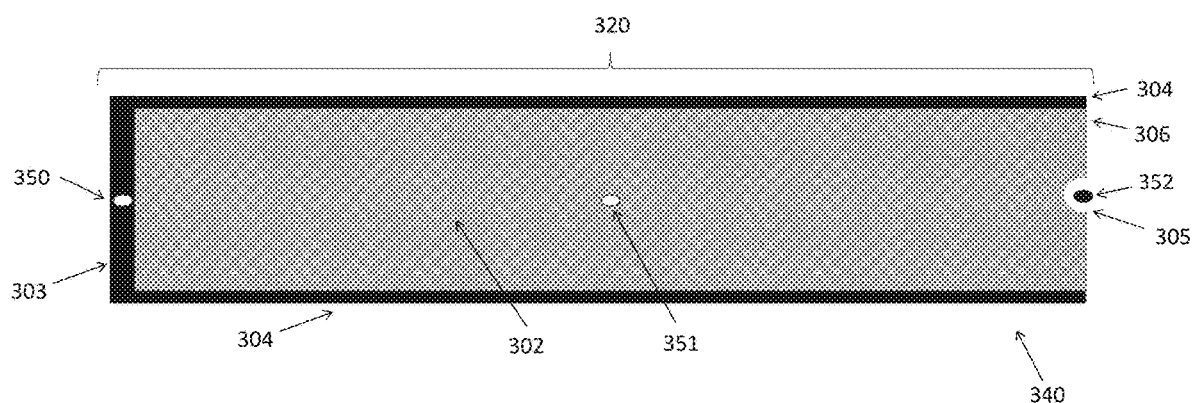
FIG. 5 is a top view of an exemplary back unit of another exemplary advertising unit.

FIG. 5 illustrates another exemplary back unit 320. The back unit 320 may comprise a base 302. A back ridge 303 may extend from or adjacent to the base 302. One or more side ridges 304 may extend from or adjacent to the base 302. The back ridge 303 may be located along a left side edge of the base 302 when considered from a top view, though such is not required. The side ridges 304 may extend along the front and rear edges of the base 302 when considered from a top view, though such is not required. The side ridges 304 and the back ridge 303 may be the same or similar size. The side ridges 304 and the back ridges 303 may accept the cover 330 in a sliding fashion. The side ridges 304 and the back ridge 303 may define a track 306 for the cover 330. The cover 330 may be accepted in an elevated position above the base 302. The space between the cover 330 and the base 302 may define a cavity for accepting one or more advertisements 235. The back ridge 303 and/or the side ridges 304 may, in exemplary embodiments, be formed by crimping, though any manufacturing technique is contemplated.

The back unit 320 may also comprise a base notch 305. The base notch 305 may be configured to accept a fastener 352. The base notch 305 may define a receptacle, such as but not limited to a threaded hole, configured to receive the fastener 352. The fastener 352 may be configured to extend into the parking lot 105, though such is not required. The base notch 305 may be semi-circular in shape and may be located along a right side edge of the base 302 when considered from a top view, though any location is contemplated. In exemplary embodiments, the back unit 320 further comprises a rear grounding hole 350 and a center grounding hole 351, though any number and location of grounding holes is contemplated. The rear grounding hole 350 may be located along a left side edge of the base 302 when considered from a top view and the center grounding hole 351 may be located in approximately the center of the base 302. The back unit 320 may be attached to the ground via fasteners, such as screws, inserted through the rear grounding hole 350 and the center grounding hole 351 in addition, or alternatively, to insertion of the fastener 352 in the base notch 305. Alternatively, or additionally, the base 320 may be affixed to the ground by alternative means such as but not limited to an adhesive.

The back unit 320 may be substantially rectangular in shape, though any shape is contemplated. The base 302 may be substantially rectangular or oval in shape, though any shape is contemplated.

Figure 6:
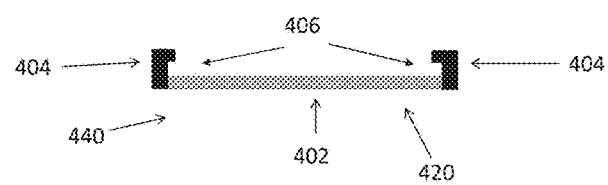
FIG. 6 is a side view of another exemplary back unit of another exemplary advertising unit.

FIG. 6 illustrates a side view of another exemplary embodiment of the back unit 420. The base 402 and one or more side ridges 404 may form a track 406 into which the cover 330 may be inserted in a sliding fashion. FIG. 6 demonstrates that in some embodiments, the back ridge 303 may not be required. FIG. 6 also demonstrates that the side ridges 304/404/504 may protrude above the base 302/402/502 to create at least a portion of the track 306/406/506. Alternatively, or additionally, the side ridges 304/404/504 may extend from or adjacent to edges of the base 302/402/502. A portion of the side ridges 304/404/504 may protrude inwardly over a portion of the base 302/402/502. In exemplary embodiments, the side ridges 304/404/504 are substantially "L" shaped. The side ridges 304/404/504 may be formed by crimping.

Figure 7:
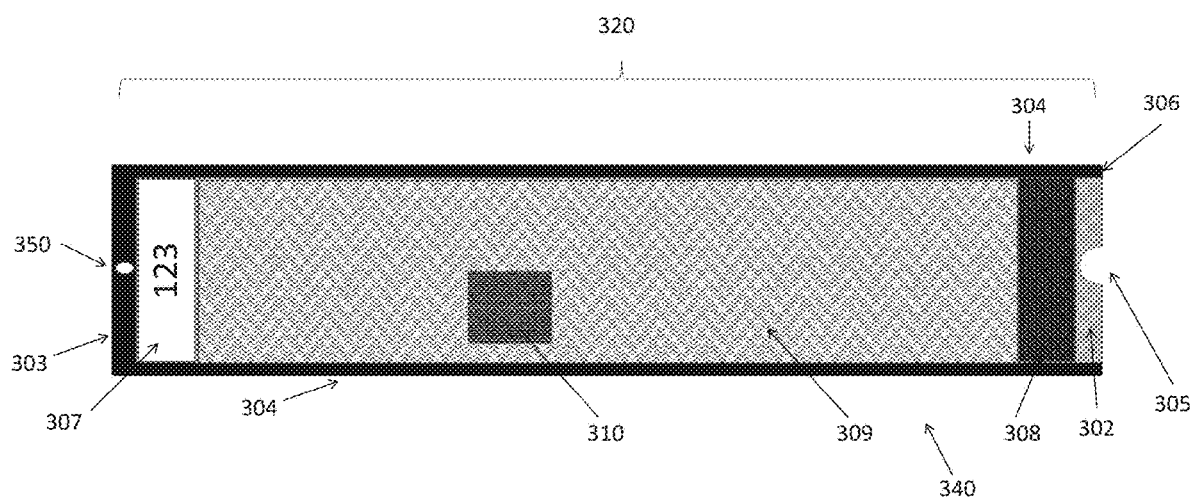
FIG. 7 is a top view top of the back unit of FIG. 5 with an exemplary advertisement deposited.

As illustrated in FIG. 7 the outer edges of the base 302 may be defined, at least in part, by the back ridge 303 and one or more side ridges 304. The back ridge 303 and the side ridges 304 may together form the track 306, which may be configured to accommodate the cover 330 in a sliding fashion. The back ridge 303 may protrude above the base 302 to create at least a portion of the track 306. Alternatively, or additionally, the back ridge 303 may extend from or adjacent to side edges of the base 302. A portion of the back ridge 303 may protrude inwardly over a portion of the base 302. In exemplary embodiments, the back ridge 303 is substantially "L" shaped. The back ridge 303 may be formed by crimping.

At least one of the edges of the base 302, such as but not limited to the right-side edge when considered from a top view, may be open such that the cover 330 may be received within the track 306 in a sliding fashion. An area 307 within the base 302 may be designated for additional advertising space and/or a parking space identifier. In exemplary embodiments, the parking space identifier may be a unique alphanumeric entry. A second area 308 may be provided for smaller advertisements or other images. The remainder of the cavity may be designated as the primary advertising space 309, though in other exemplary embodiments the entire cavity may be the primary advertising space 309. The advertisements 235 placed in the primary advertising space 309 may comprise an optically scannable code 310, such as but not limited to a QR code or other promotional codes.

Figure 8:
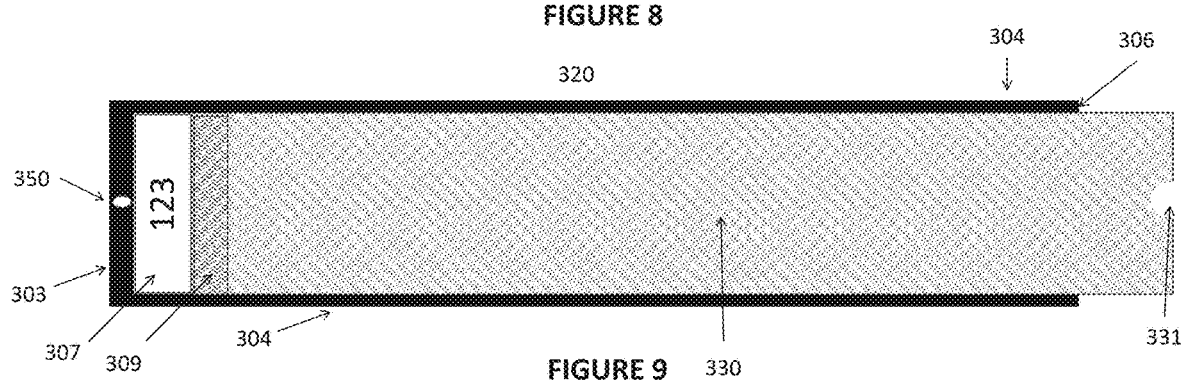
FIG. 8 is a top view the advertising unit of FIG. 7 with an exemplary cover partially inserted and shown as non-transparent for purposes of demonstrating the method of insertion.

FIG. 8 illustrates the back unit 320 with the cover 330 shown partially inserted into track 306. The track 306 may be defined by the back ridge 303, and one or more side ridges 304. However, in other exemplary embodiments, the track 306 may be defined by the side ridges 304. In the illustrated embodiment, the cover 330 is shown as non-transparent so as to illustrate the sliding arrangement between the cover 330 and the back unit 320. A cover notch 331 may be provided in the cover 330. The cover notch 331 may be identical in size and shape to the base notch 305, though any size and shape is contemplated. The cover 330 may be comprised of a transparent or translucent material. The cover 330 may be comprise of any material, such as but not limited to a polymer.

Figure 9:
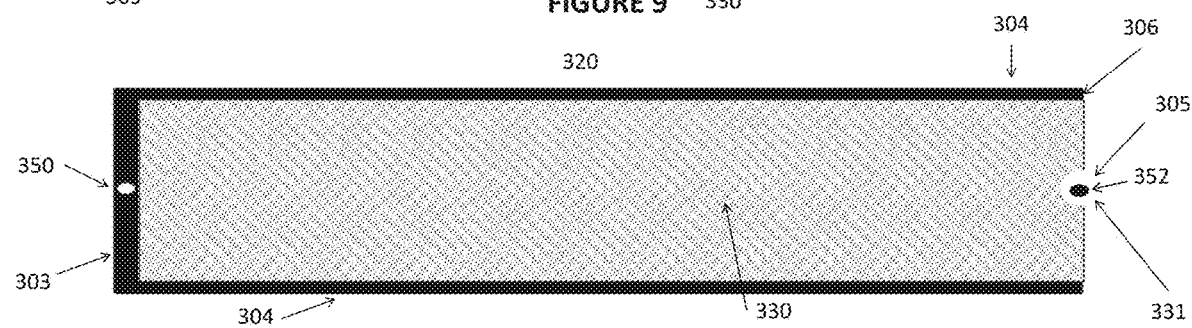
FIG. 9 is a top view of the advertising unit of FIG. 7 with the cover fully inserted and shown as non-transparent for purposes of demonstrating the method of insertion.

FIG. 9 illustrates the back unit 320 with the cover 330 fully inserted into the track 306. The track 306 may be defined by a back ridge 303, and one or more side ridges 304. The cover 330 is shown as non-transparent so as to illustrate the sliding arrangement between the cover 330 and the back unit 320. The base notch 305 may be aligned with the cover notch 331 so as to create a space into which the fastener 352 may be inserted. This arrangement may inhibit the tampering or removal of the cover 330 and restricting access to the advertisements 235 contained within the advertising unit 240.

Figure 10:
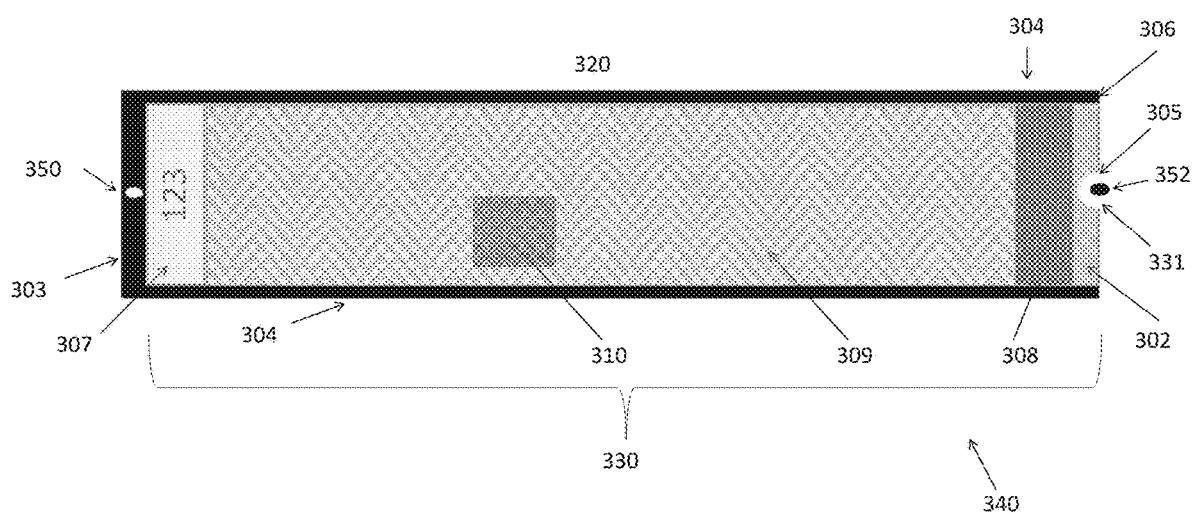
FIG. 10 is a top view of the advertising unit of FIG. 7 with the cover fully inserted and shown as translucent.

FIG. 10 illustrates the back unit 320 with the cover 330 shown fully inserted into track 306. The tack 306 may be defined, at least in part, by the back ridge 303, the side ridges 304, and the base 302. In this figure, the cover 330 is shown as transparent so as reveal the underlying primary advertising space 309, the second advertising area 308, and parking lot identifier 307. However, in other exemplary embodiments, the primarily advertising space 309 may expand to fill the areas illustrated by the second space 308 and the parking lot identifier 307. The base notch 305 and cover notch 331 may be aligned to create a space into which the fastener 352 may be inserted.

Figure 11:
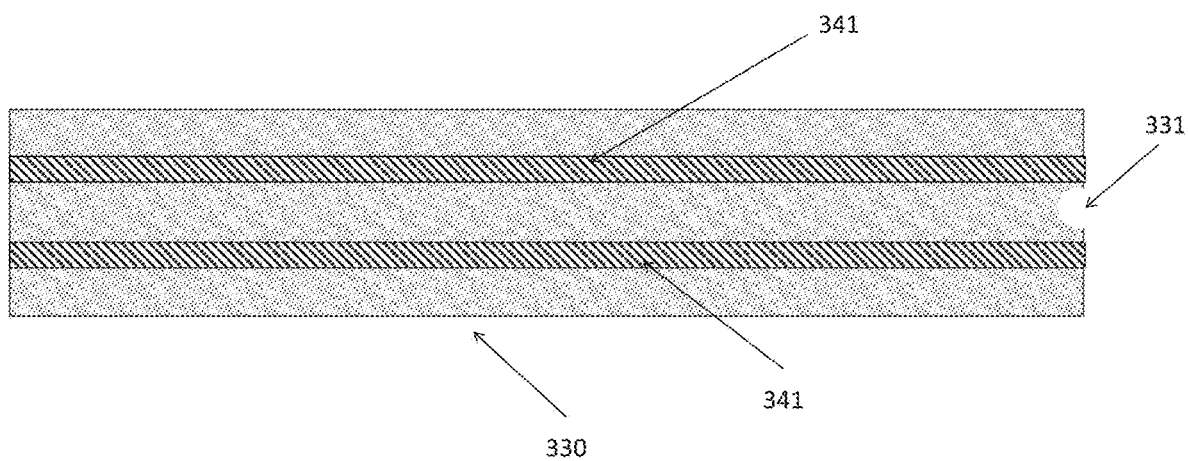
FIG. 11 is a top view of another exemplary cover, shown in isolation in order to illustrate additional features thereof.

FIG. 11 illustrates the cover 330 with one or more traction strips 341. The traction strips 341 may be comprised of a roughened surface or a material having a relatively higher coefficient of friction than the remainder of the cover 330. The traction strips 341 may be comprised of, for example without limitation, a tacky substance, a rubberized material, some combination thereof, or the like. The traction strips 341 may be configured to minimize slips and falls as pedestrians walk over the advertising units 240. The traction strips 341 may be comprised of a material having a higher coefficient of friction than the remainder of the cover 330. The traction strips 341 may be configured to help prevent individuals from slipping when walking over the cover 330. Any number, size, shape, location, and orientation of the traction strips 341 is contemplated. For example, without limitation, the traction strips 341 may comprise a textured surface, be comprised of a tacky material, some combination thereof, of the like. In exemplary embodiments, a single traction strip 341 may cover substantially the entirety of the cover 330. In such embodiments, the traction strip 341 may essentially comprise a coating for the cover 330. However, the traction strip 341 may be integrally formed with the cover 330.

In exemplary embodiments, the traction strips 341 may be comprised of a material which is also reflective. In other exemplary embodiments, a separate, reflective material or coating may be deposited on some or all of the cover 330.

The advertising units 140/240/340/440/540 shown and described herein may be installed near parking spaces 110, though such is not required. In exemplary embodiments, the advertising unit 140/240/340/440/540 may be installed between adjacent parking spaces 110 in a parking lot 105. The advertising units 140/240/340/440/540 may be installed along one or more parking space boundaries 115. The boundaries 115 may comprise painted lines, curbs, dividers, or the like. However, any location of the advertising units 140/240/340/440/540 is contemplated.

The advertising units 140/240/340/440/540 shown and described herein may be sized and configured to have a low profile. In particular, the advertising units 140/240/340/440/540 may be sized and configured to reduce the chance of tripping over the advertising unit 140/240/340/440/540. More specifically, the height of the advertising units 140/240/340/440/540 may be configured to extend less than ¼ inch above the surface of the ground, parking lot 105, or other structure to which the advertising units 140/240/340/440/540 are installed. This may be accomplished by modifying the height of the advertising unit 140/240/340/440/540 and its various components and/or mounting the advertising unit 140/240/340/440/540 in a partially or wholly recessed fashion. In particular, the advertising unit 140/240/340/440/540 may be installed to be flush with at least the adjacent surface of the ground, parking lot 105, or other structure.

Various components of the advertising units 140/240/340/440/540 shown and described herein, including but not limited to the back units 120/220/320/420/520, the covers 130/230/330/430/530, and the like, may be configured to withstand the weight of a vehicle without breaking, cracking, or otherwise inelastically deforming. Alternatively, or in addition, various components of the advertising unit 140/240/340/440/540, including but not limited to the back unit 120/220/320/420/520, the cover 130/230/330/430/530, and the like may be configured to withstand shear or other forces created by a vehicle contacting the advertising unit 140/240/340/440/540 or various component thereof without breaking, cracking, or otherwise inelastically deforming.

Figure 12:
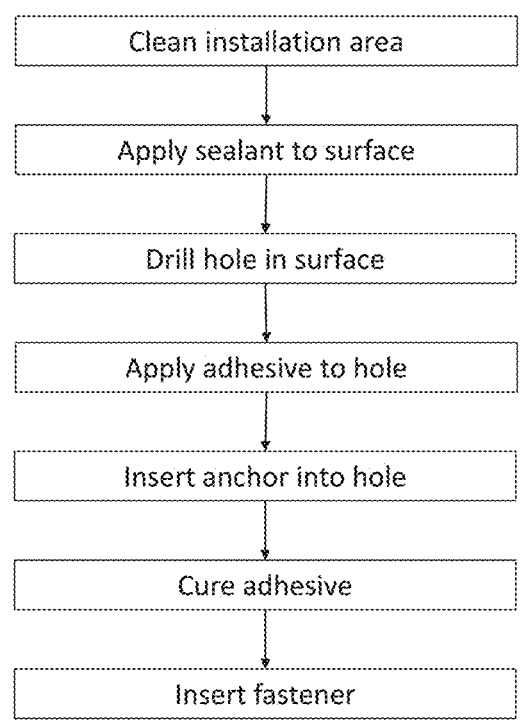
FIG. 12 is a simplified block diagram illustrating an exemplary method for installing the advertising units.

FIG. 12 is a simplified block diagram illustrating an exemplary method for installation the advertising units 140/240/340/440/540. An area of the surface where the advertising unit 140/240/340/440/540 is to be installed may be cleaned. The area may be cleaned by sweeping, vacuuming, washing, power washing, some combination thereof, or the like.

A sealant may be applied to the cleaned area. However, in embodiments where the cleaning step is not required the sealant may be provided to the area of the surface where the advertising unit 140/240/340/440/540 is to be installed. In exemplary embodiments, the surface may be a parking lot 105 and the sealant may be an asphalt sealant, though any type of surface and any type of sealant is contemplated. In other exemplary embodiments, the sealant may be a tape, such as but not limited to, duct tape.

A hole may be drilled through the area of the surface where the sealant was applied. The use of a sealant may help to prevent cracking or other damage to the surface. However, in other exemplary embodiments, it is not necessary to first apply a sealant and a hole is simply drilled into the area of the surface where the advertising unit 140/240/340/440/540 is to be installed or the cleaned area.

Adhesive may be applied to the hole, for example without limitation, by depositing the adhesive within the hole. The adhesive may be a glue, an epoxy, some combination thereof, of the like. Any type of adhesive is contemplated.

An anchor may be inserted into the hole. The anchor may be configured to mate with a fastener, such as but not limited to the fastener 352. For example, without limitation, the anchor may comprise threads configured to mate with the threads of the fastener. The anchor may be a threaded anchor, expansion anchor, hollow wall anchor, wall plug anchor, toggle bolt, winged anchor, spring anchor, sleeve anchor, some combination thereof, or the like. Any type of anchor is contemplated.

The adhesive may be cured. Curing of the adhesive may be performed by waiting a period of time, exposing the adhesive to air, forcing air over the adhesive, applying heat, applying cool, applying a catalyst, some combination thereof, or the like. Any method or devices for curing the adhesive are contemplated.

One or more fasteners may be passed through the advertising unit 140/240/340/440/540 and into one or more respective anchors. For example, without limitation, the fastener may be passed through the center grounding hole 351 into the corresponding anchor located in the drilled hole. This process may be repeated such that the advertising unit 140/240/340/440/540 may be secured with any number of fasteners to any number of anchors in any number of drilled holes in the surface. The advertising unit 140/240/340/440/540 may comprise any number of corresponding apertures for securing the advertising unit 140/240/340/440/540 to the surface.

In exemplary embodiments, an adhesive may be used as an alternative to, or with, one or more of the fasteners. In exemplary embodiments, the adhesive may be a two-part epoxy, though any type or adhesive is contemplated. The fasteners may additionally or alternatively, be used in conjunction with one or more anchors. For example, without limitation, a hole may be drilled and glue may be inserted. An anchor may be inserted into the hole. The anchor may be configured to mate with a corresponding fastener. The fasteners may then be inserted through one or more components of the advertising unit and be made to mate with the anchor.

Figure 13:
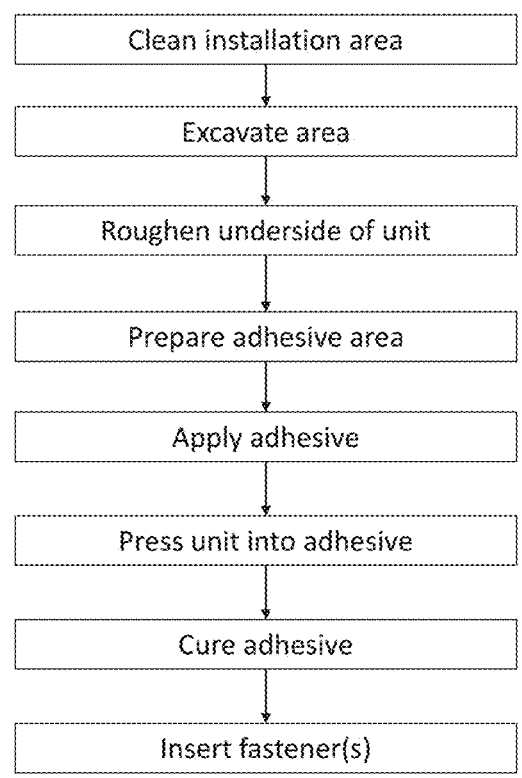
FIG. 13 is a simplified block diagram illustrating another exemplary method for installing the advertising units.

FIG. 13 is a simplified block diagram illustrating another exemplary method for installing the advertising units 140/240/340/440/540. After cleaning the area, which may be accomplished by way of the techniques described with respect to FIG. 12, though any cleaning technique is contemplated. The area cleaned may be the divider 115 in the parking lot 105, though any area is contemplated.

An installation area may optionally be excavated from the surface of the ground, such as but not limited to, a parking lot 105, though such is not required. Such excavation may be accomplished by use of a jackhammer, a shovel, a pick axe, a chisel, a flailing machine, such as but not limited to, a chain flail, some combination thereof, or the like. The excavation area may be sized to accommodate the advertising unit 140/240/340/440/540. In exemplary embodiments, the excavation area may be at least the length of the advertising unit 140/240/340/440/540, 4 inches wide, and ¼ inch deep, though any size excavation area is contemplated. Such excavation, where used, may advantageously lower the height that the advertising unit 140/240/340/440/540 protrudes from the surrounding surface. In this way, the risk of tripping over the advertising unit 140/240/340/440/540 may be diminished or eliminated. Such excavation may be to any height including, but not limited to, such that an upper surface of the advertising unit 140/240/340/440/540 does not extend beyond a predetermined height from some or all of the surrounding surface, such that the upper surfaces of the advertising unit 140/240/340/440/540 is substantially flush with some or all of the surrounding surface, or such that the upper surface of the advertising unit 140/240/340/440/540 is lower than some or all of the surrounding surface. Furthermore, such excavation may permit, or increase the ability of, the advertising unit 140/240/340/440/540 to withstand the forces created by a vehicle tire resting on, or passing over, the advertising unit 140/240/340/440/540 such as, but not limited to, weight, torsion or sheer forces. In other exemplary embodiments, no such excavation is required. In some embodiments, the excavation described herein may not be necessary.

The area where an adhesive is to be applied may first be prepared. The area may be prepared by laying tape around the area, using a stencil, laying a framework, some combination thereof, or the like. The preparation may be configured to prevent the adhesive from spilling over beyond where it is needed. In other exemplary embodiments, such preparation is not required and application is performed freehand.

The adhesive may be applied. The adhesive may be applied to the cleaned area, the prepared area, or the excavated area. The adhesive may be applied by a brush, roller, gun, tube, some combination thereof, or the like. Alternatively, or additionally, the adhesive may be applied to the underside of the advertising unit 140/240/340/440/540 to be installed. In such embodiments, the underside of the advertising unit 140/240/340/440/540 may be roughened prior to application of the adhesive, though such is not required. The adhesive, in exemplary embodiments, may be a two-part epoxy.

The advertising unit 140/240/340/440/540 may be deposited within area containing the adhesive. Alternatively, or additionally, the back unit 120/220/320/420/520 may be deposited within area containing the adhesive and the cover 130/230/330/430/530 may be subsequently placed on the back unit 120/220/320/420/520. The advertising unit 140/240/340/440/540 or the back unit 120/220/320/420/520 may be pressed into the area containing the adhesive such that the adhesive is sandwiched between the underside of the back unit 120/220/320/420/520 and the underlying surface. The adhesive may be cured. Such curing may be accomplished by the techniques described with respect to FIG. 12, though curing techniques are contemplated.

Once cured or while curing, fasteners 352/552 may be inserted through some or all of the advertising units 140/240/340/440/540, though such is not required. Such fasteners 352/552 may be passed into the adhesive, into the ground, into a portion of the advertising unit 140/240/340/440/540, some combination thereof, or the like. Following removal of the advertising units 140/240/340/440/540, the area, particularly where excavation is used, may be remediated with the use of concrete, asphalt, dirt, seed, some combination thereof, or the like.

Figure 14:
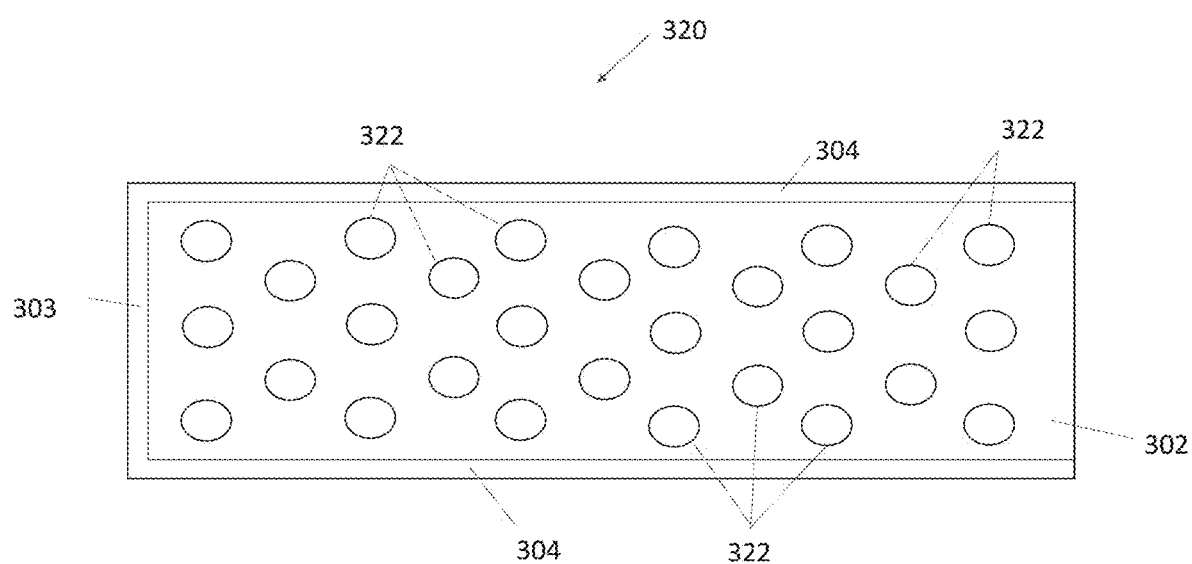
FIG. 14 is a top view of the back unit of FIG. 7 with drainage or aeration holes.

FIG. 14 is a top view of the back unit 320. The back unit 320 may comprise one or more drainage or weep holes 322. Said drainage holes 332 may alternatively, or additionally, be used for aeration. Any number and size of drainage holes 322 are contemplated. The drainage holes 322 may be circular in shape, though any shape is contemplated. In exemplary embodiments, a number of such drainage holes 322 are spaced apart along the base 302, though any number and location of such drainage holes 322 is contemplated. Such drainage holes 322 may, for example without limitation, be alternatively or additionally located on the side of the base 302. The drainage holes 322 may be configured to permit water which has entered the advertising unit 340 to be drained therefrom by gravitational forces. Alternatively, or additionally, various portions of the advertising unit 340 may be curved or otherwise graded to encourage the flow of water off the advertising unit 340 and/or to the drainage holes 322. For example, without limitation, the cover 330 may be curved. As another example, without limitation, the base 302 may be graded towards some or all of the drainage holes 322. Alternatively, or additionally, some or all components of the advertising units 340, such as but not limited to the cover 330 and the advertisements 235, may be coated with a hydrophobic compound. Said drainage holes 322 may be formed by stamping, punching, cutting, some combination thereof, or the like. Alternatively, or additionally, said drainage holes 322 may be integrally formed with the base 302.

All steps shown and described herein are optional, may be performed in any order, and may be repeated any number of times. The fasteners shown and described herein may be of any type. For example, the fasteners may be screws, anchors, nails, bolts, some combination thereof, or the like. The fasteners may comprise one or more tamper-resistant features such as a unique head design.

Figure 15:
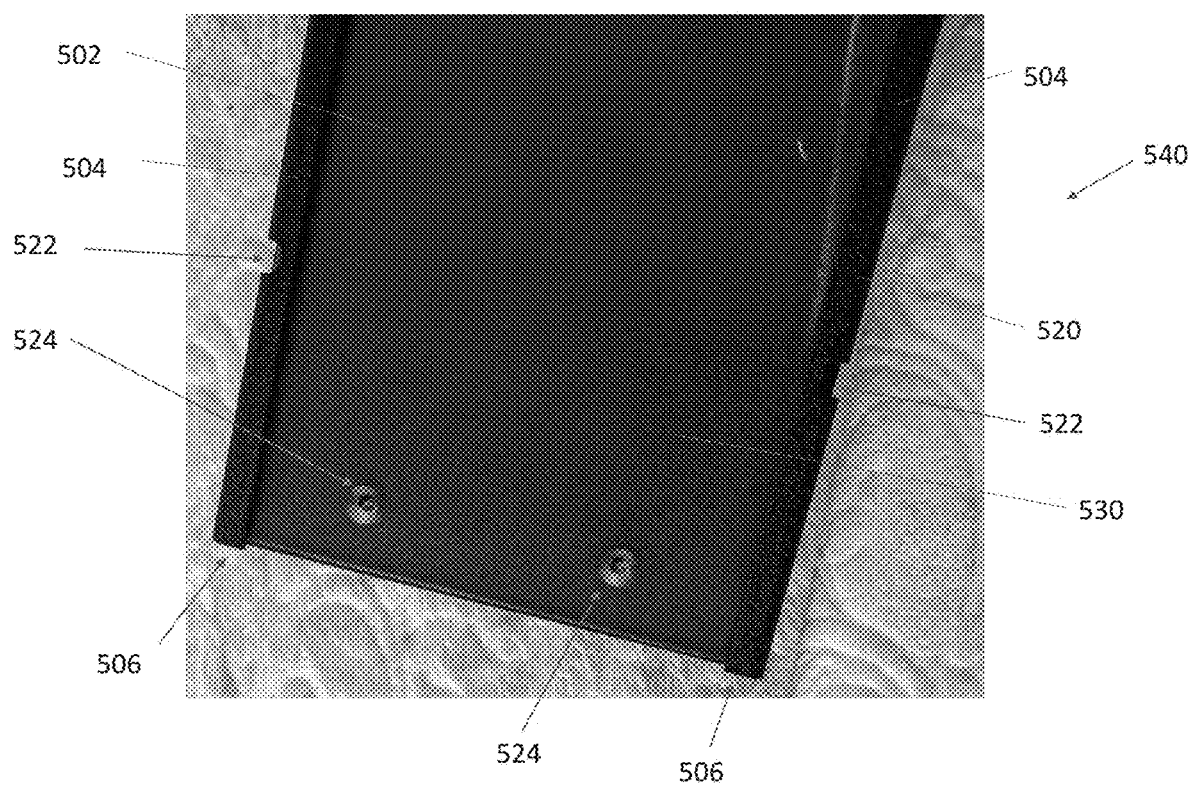
FIG. 15 is a top view of another exemplary advertising unit.
Figures 16, 17:
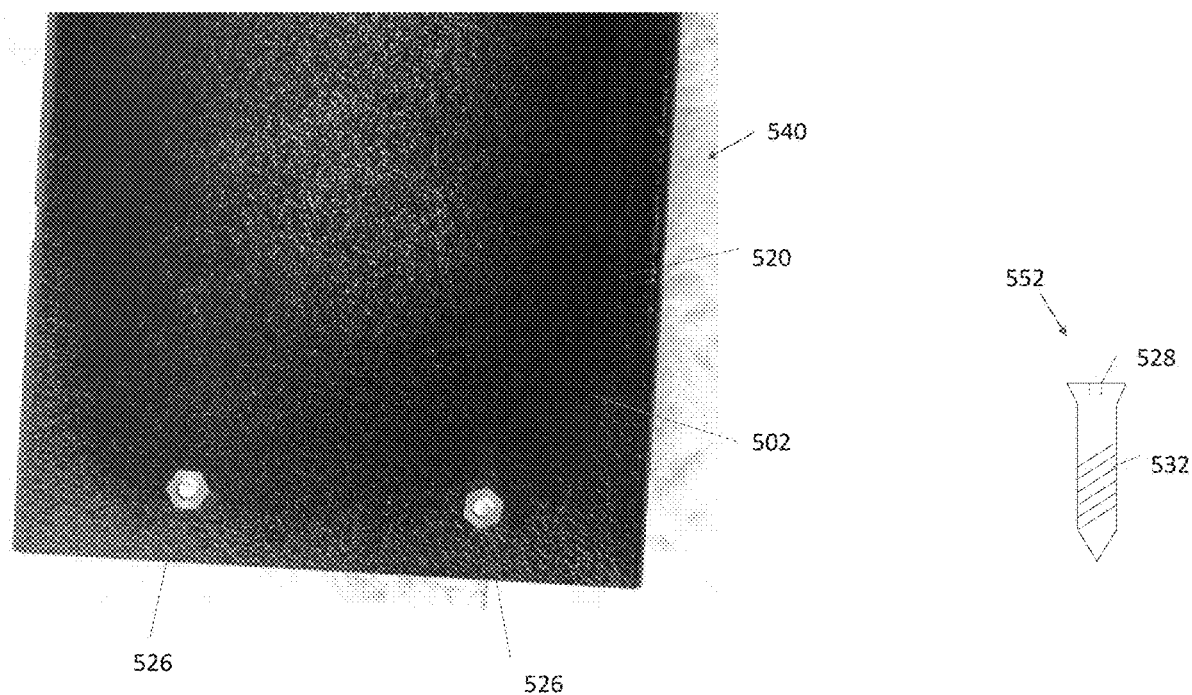
FIG. 16 is a bottom view of the advertising unit of FIG. 15.
FIG. 17 is a side view of an exemplary fastener for use with the advertising unit of FIG. 15.

FIG. 15 through FIG. 17 illustrate another exemplary embodiment of the advertising unit 540. The advertising unit 540 may comprise a back unit 520. The back unit 520 may be substantially rectangular in shape, though any shape is contemplated. The back unit 520 may comprise at least a first and second side ridge 504 forming a track 506. The back unit 520 may further comprise a back ridge. The back unit 520 and the side ridges 504 may be formed by extrusion. The back ridge may be formed by crimping a distal end of each of the side ridges 504.

The track 506 may accommodate a cover 530. The cover 530 may be substantially rectangular in shape, though any shape is contemplated. The back ridge may serve as a backstop for the cover 530.

One or more apertures 524 may be formed in the cover 530. Such apertures 524 may be drilled, stamped, or integrally formed, for example without limitation. In exemplary embodiments, each of the apertures 524 are countersunk to accommodate a fastener 552. The countersunk portion of the apertures 524 may be conical in shape to accommodate the head of the fastener 552 though any shape aperture 524, countersunk portion, and fastener 552 head is contemplated.

Each of the fasteners 552 may comprise a tamper-resistant feature 528 such as, but not limited to, a non-standard shaped insert for a tool. Each of the fasteners 552 may comprise a threaded portion 532. One or more receivers 526 may be installed in the back unit 520. The same number of receivers 526 may be installed as the number of apertures 524 provided. Each of the receivers 526 may be installed directly below each of the aperture 524. The receivers 526 may be configured to receive the threaded portion 532 of the fasteners 552. The receivers 526 may comprise nuts.

By passing the fasteners 552 through the apertures 524 and into the receivers 526 the cover 530 may be secured to the back unit 520. The apertures 524 and the fastener 552 may be configured to cause an upper surface of the fastener 552 to be flush with an upper surface of the cover 530 adjacent the apertures 524 when the fastener 552 is installed. In exemplary embodiments, a first and second aperture 524 are provided on a first end of the cover 530 and a corresponding first and second receiver 526 are provided on a first end of the back unit 520. The first and second aperture 524 and the first and second receiver 526 may be aligned with a front edge of the advertising unit 540. The front edge may be the open end of the advertising unit 540 configured to receive the cover 530 into the track 506 of the back unit 520.

The weep or drainage holes 522 may be located along any portion of the back unit 520, such as but not limited to the side ridges 504.

Figure 18:
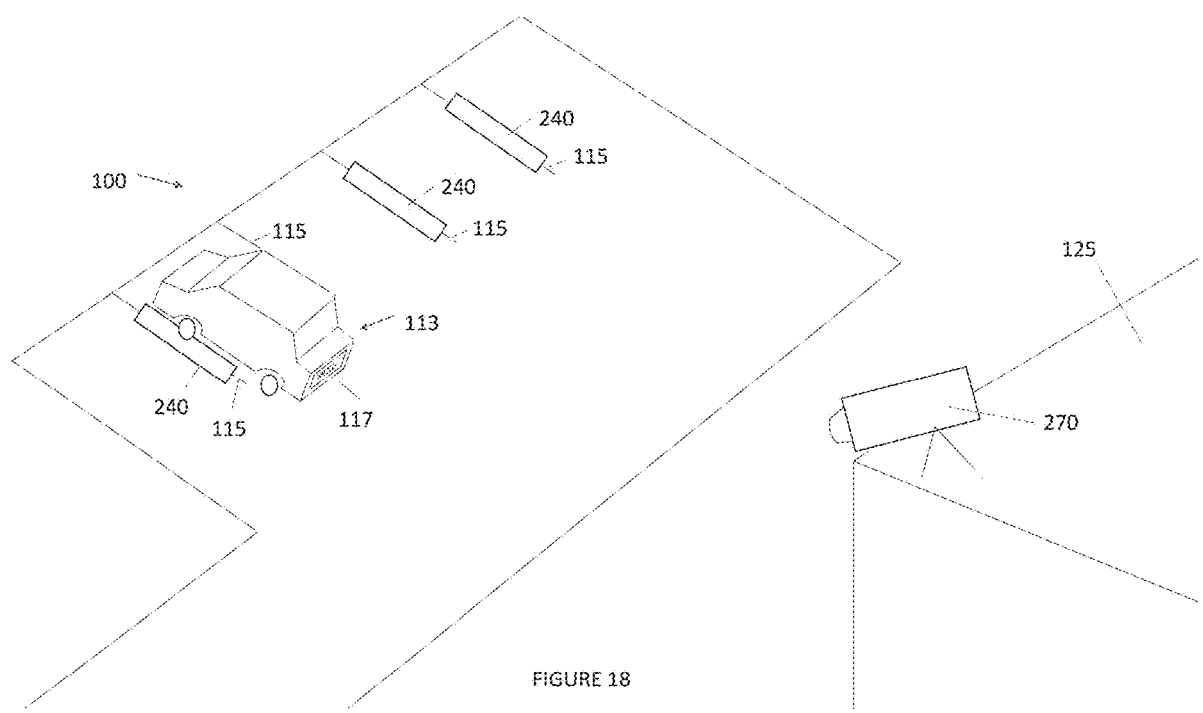
FIG. 18 is a perspective view of an exemplary parking lot with a number of exemplary advertising units installed.

FIG. 18 is a perspective view of the parking lot 100 with a number of advertising units 240 installed. In exemplary embodiments, each of the advertising units 240 may comprise the electronic display 237. Each of the advertising units 240 may comprise the network connection device 285. Any type of kind of advertising unit 240 having any number of components is contemplated.

The camera 270 may be installed in an overwatch position to view some or all of the parking lot 100. The camera 270 may be mounted to a structure 125. The structure 125 may be a building, a wall, a roof, a pole, a post, the ground, a sign, a sidewalk, a surface, some combination thereof, or the like. The parking lot 100 may be configured to accommodate a number of vehicles 113. Each of the vehicles 113 may comprise a license plate 117 or other identifier. While the advertising units 240 are illustrated as being installed along divider lines 115 in the parking lot 110, any location is contemplated. The advertising units 240 may be used in conjunction with any size, shape, number, or the like parking lots 110 having any size, shape, number, or the like parking spaces to accommodate any number of vehicles 113.

Figure 19:
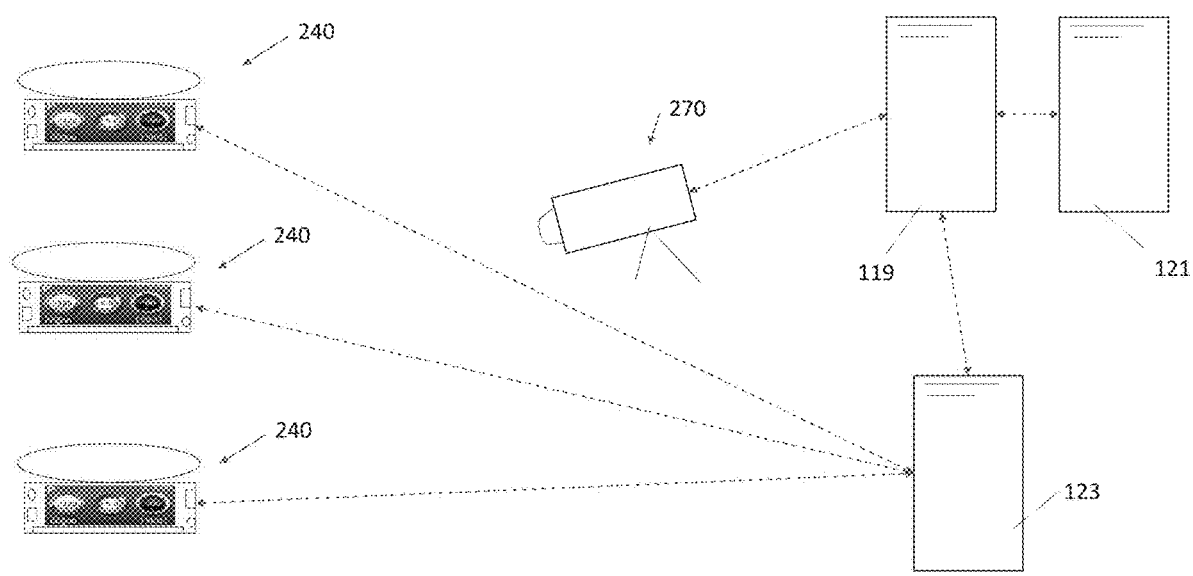
FIG. 19 is a simplified plan view of an exemplary system.

FIG. 19 illustrates the camera 270 in electronic communication with a first server 119. The first server 119 may comprise software configured to determine vehicle identification information. Vehicle identification information may comprise a vehicle 113 make, a vehicle 113 model, license plate 117 characters for the vehicle 113, some combination thereof, or the like. Such software may comprise machine vision software, optical character recognition software, some combination thereof, or the like. The first server 119 may be in electronic communication with a database 121. The database 121 may comprise demographic information associated with one or more license plates 117 and/or vehicle makes and models. The demographic information may include zip codes, addresses, age, sex, names, consumer preferences, estimated household income, some combination thereof, or the like.

The first server 119 may be in electronic communication with a second server 123. The second server 123 may comprise a number of advertising images, each associated with one or more types of demographic information, vehicle makes, vehicles models, some combination thereof, or the like. The second server 123 may be in communication with some or all of the advertising units 240 in one or multiple parking lots 100.

Figure 20:
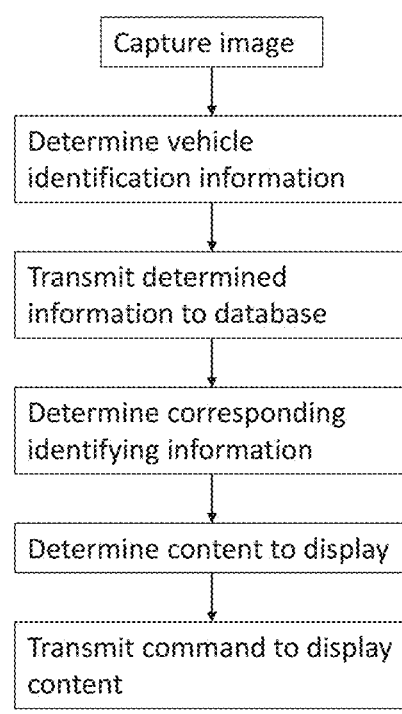
FIG. 20 is a flow chart with exemplary logic for determining content to display on the advertising units.

FIG. 20 is a flow chart with exemplary logic for determining content to display on the advertising units 240. The camera 270 may be configured to take one or more images of the parking lot 100. The camera 270 may be moveable such that multiple images of one or more parking lots 100 may be taken. The camera 270 may be configured to take such images continuously or periodically. The camera 270 may transmit such images to the first server 119. The first server 119 may be configured to determine the make, model, and/or license plate 117 information for all vehicles 113 in the received image. The determined make, model, and/or license plate 117 information for all vehicles 113 in the received image may be transmitted to database 121 and the corresponding demographic information, if available, may be returned. The demographic information may be transmitted to the second server 123. The second server 123 may be configured to determine advertising content for display on the advertising units 240 near where the vehicles 113 are located. The second server 123 may transmits commands to the advertising units 240 to display such content. Alternatively, or additionally, the second server 123 may transmit the content for display. In exemplary embodiments, the advertising units 240 receive such commands and/or content by way of the network communication devices 285.

In this way, the content displayed, such as advertisements, announcements, or the like, may be selected based upon available demographic information. For example, without limitation, advertisements having an older target demographic may be selected for display when a license plate 117 associated with a registered vehicle owner having an older age. As another example, without limitation, advertisements for luxury products may be displayed when a luxury make or model of vehicle is detected. As yet another example, without limitation, advertisements for products having a primarily female target audience may be displayed when demographic information is returned indicating that the vehicle owner is a female. Of course, this is merely exemplary and is not intended to be limiting. Advertising content selected for display may be selected based on any number of factors.

Figure 21:
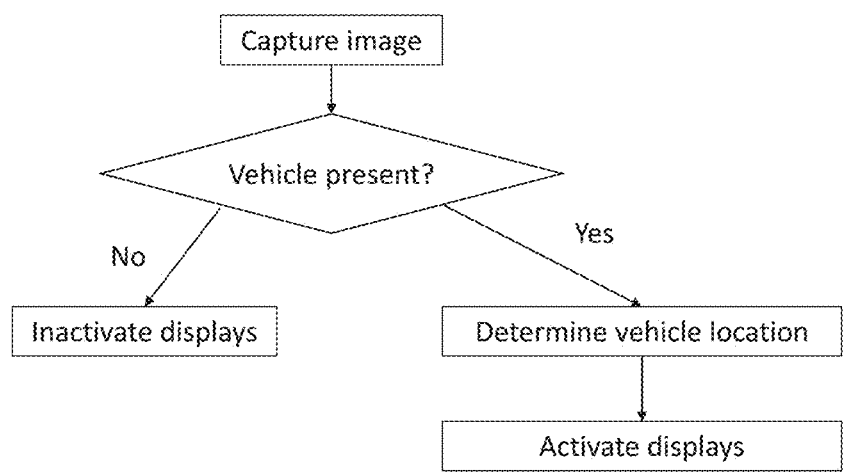
FIG. 21 is a flow chart with exemplary logic for activating the advertising units.

FIG. 21 is a flowchart with exemplary logic for activating the advertising units 240. In exemplary embodiments, the camera 270 may be configured to determine the presence or non-presence of the vehicle 113. If no vehicles 113 are detected in one or more captured images, one or more of the advertising units 240 may be inactivated. For example, without limitation, the electronic displays 237 for such units may be turned off, left off, or the backlight may be reduced to a low light level to conserve power. The advertising units 240 to be inactivated may be those within the one or more captured images, all advertising units 240 for the parking lot 105, advertising units 240 within a predetermined distance of the camera 270, some combination thereof, or the like.

If a vehicle is determined to be present in the one or more captured images, the vehicle's 113 location may be determined. Nearby advertising units 240 may be activated. For example, without limitation, the electronic displays 237 for such units may be turned on, left on, or the backlight may be increased to a higher light level to better illuminate the displayed image. The advertising units 240 to be activated may be those within the one or more captured images, all advertising units 240 for the parking lot 105, advertising units 240 within a predetermined distance of the camera 270, some combination thereof, or the like. In exemplary embodiments, without limitation, advertising units 240 installed on one or more sides of the space where the vehicle 113 is parked may be activated. As yet another example, without limitation, advertising units 240 along the vehicle's 113 actual or predicted path may be activated.

Such presence or non-presence and/or location of the vehicles 113 may be determined using machine vision software. Such software may be provided at the first server 119. The activation and inactivation of the advertising units 240 may be communicated from the first server 119 to each of the adverting units 240 by way of network communication devices 285 installed at each of the advertising units 240. Vehicle identification information may include the presence and/or location of vehicles 113 in the captured images though such is not required.

In other exemplary embodiments, the camera 270 may serve as a security camera for the advertising units 240 within the parking lot 105. In such embodiments, the camera 270 may not be in electronic communication with the advertising units 240.

The same or similar numbering may be used across various embodiments to denote the same or similar components, though such is not necessarily required. It is contemplated that any component described or illustrated with respect to a given embodiment may be used in conjunction with any or all of the other embodiments shown or described herein.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may be personal computers, smartphone, tablets, databases, servers, or the like. The electronic connections described herein may be accomplished by wired or wireless means.

What is claimed is:

1. A system for displaying advertisements to occupants of vehicles, said system comprising:
   a cover, wherein said cover is transparent or translucent;
   a back unit;
   an electronic display located between said back unit and said cover;
   a camera; and
   one or more electronic storage devices comprising executable software instructions, which when executed by one or more processors, configure the one or more processors to:
   receive an image from the camera;
   determine vehicle identification information for vehicles in the image;
   determine content to display at the electronic display based on the vehicle identification information; and
   command the electronic display to display the determined content.

2. The system of claim 1 wherein:
   the back unit is adapted to be mounted to a parking lot; and
   the camera is mounted to a structure located at or adjacent to the parking lot in a way which permits the camera to view some or all of the parking lot.

3. The system of claim 2 wherein:
   the structure comprises a light pole located at the parking lot.

4. The system of claim 1 wherein:
   the camera is located on the back unit.

5. The system of claim 1 wherein:
   the vehicle identification information comprises a vehicle make or model.

6. The system of claim 1 wherein:
   the vehicle identification information comprises license plate characters.

7. A system for displaying advertisements to occupants of vehicles, said system comprising:
   a number of advertising units, each positioned within a parking lot and comprising:
   a cover, wherein said cover is transparent or translucent;
   a back unit;
   an electronic display located between said back unit and said cover; and
   a network communication device configured to receive commands;
   a camera located at an elevated position from a surface of the parking lot, wherein said camera is configured to capture images of vehicles located at the parking lot;
   a server adapted to receive the captured images from the camera and extract vehicle identification information for the vehicles within the captured images and send commands activating at least some of the number of advertising units.

8. The system of claim 7 further comprising:
   a database adapted to receive the extracted vehicle identification information and return associated demographic information; and
   a second server adapted to receive the associated demographic information and command one or more of the number of advertising units to display a particular advertising image based upon the received associated demographic information.

9. The system of claim 8 wherein:
   the vehicle identification information comprises license plate characters; and
   the demographic information comprises zip codes.

10. The system of claim 8 wherein:
    the vehicle identification information comprises vehicle makes or models; and the demographic information comprises estimated household incomes.

11. The system of claim 7 wherein:
the camera is mounted to a structure located within or adjacent to the parking lot.

12. The system of claim 7 wherein:
the vehicle identification information comprises the presence of the vehicles.

13. The system of claim 12 wherein:
each of the advertising units are positioned along divider lines defining parking spaces in the parking lot;
the vehicle identification information comprises the parking space location of the vehicles; and
the at least some of the number of advertising units comprises the advertising units positioned along divider lines adjacent to the parking spaces in the parking lot.

14. The system of claim 7 wherein:
each of the covers are configured to withstand the weight of a vehicle passing over or resting on the advertising unit; and
each of the covers are configured to withstand the sheer forces created by a vehicle passing over the advertising unit.

15. A method for displaying advertisements to occupants of vehicles, said method comprising the steps of:
providing a number of advertising units within a parking lot, wherein each of said advertising units is positioned adjacent to a respective parking space within said parking lot and comprises an electronic display configured to display advertising images;
capturing, by way of a camera, an image of at least one vehicle within a parking lot;
determining vehicle identification information for the at least one vehicle in the captured image; and
displaying one or more advertising images at the electronic displays for at least some of the advertising units in response to the determined vehicle identification information.

16. The method of claim 15 further comprising the steps of:
determining demographic information associated with the vehicle identification information; and
selecting advertising content based on said demographic information, wherein the displayed advertising images comprise the selected advertising content.

17. The method of claim 15 further comprising the steps of:
activating one or more of the advertising units, wherein the vehicle identification information comprises the presence of the at least one vehicle.

18. The method of claim 16 wherein:
the vehicle identification information comprises license plate characters; and
the demographic information comprises vehicle registration information associated with said license plate characters.

19. The method of claim 16 wherein:
the vehicle identification information comprises a vehicle make or model; and
the demographic information comprises consumer preferences associated with said vehicle make or model.

20. The method of claim 15 wherein:
the camera is positioned to view the entire parking lot; and
the advertising unit comprises a back unit sized for placement along a dividing line in the parking lot and a cover configured to withstand the weight of a vehicle passing over the advertising unit without crushing the electronic display.

* * * * *